United States Patent
Jinping

[11] Patent Number: 5,951,928
[45] Date of Patent: Sep. 14, 1999

[54] POLYMER'S ELECTROMAGNETIC DYNAMIC INJECTION MOLDING METHOD AND THE APPARATUS THEREFOR

[75] Inventor: Qu Jinping, Guang Zhou, China

[73] Assignee: South China University of Technology, Guang Zhou, China

[21] Appl. No.: 08/879,890

[22] Filed: Jun. 20, 1997

[30] Foreign Application Priority Data

Jul. 5, 1996 [CN] China .................................. 96108387

[51] Int. Cl.$^6$ .................................................. B29C 45/50
[52] U.S. Cl. ...................... 264/69; 264/328.17; 264/349; 366/78; 366/100; 425/207; 425/587
[58] Field of Search .............................. 366/78, 100, 117, 366/118, 127; 264/69, 328.1, 349, 478, 328.12, 328.17; 425/207, 208, 582, 583, 587

[56] References Cited

U.S. PATENT DOCUMENTS

| | | | |
|---|---|---|---|
| 4,994,220 | 2/1991 | Gutjahr et al. | 264/69 |
| 5,028,373 | 7/1991 | Taniguchi et al. | 264/328.1 |
| 5,160,466 | 11/1992 | Allan et al. | 264/69 |
| 5,202,066 | 4/1993 | Furusawa et al. | 264/69 |
| 5,217,302 | 6/1993 | Jin-ping | 366/79 |
| 5,540,495 | 7/1996 | Pickel | 366/78 |
| 5,554,326 | 9/1996 | Nakazawa et al. | 264/69 |
| 5,770,131 | 6/1998 | Bubel et al. | 264/69 |

FOREIGN PATENT DOCUMENTS

| | | |
|---|---|---|
| 90101034 | 5/1992 | China . |
| 92103639.6 | 6/1994 | China . |
| 0 444 306 | 9/1991 | European Pat. Off. . |
| 0 723 848 | 7/1996 | European Pat. Off. . |
| 43 44 335 | 6/1995 | Germany . |
| 60-132721 | 7/1985 | Japan . |
| 61-266218 | 11/1986 | Japan . |
| 3-278930 | 12/1991 | Japan . |

*Primary Examiner*—Jill L. Heitbrink
*Attorney, Agent, or Firm*—Burns, Doane, Swecker & Mathis LLP

[57] ABSTRACT

A charging barrel and screw as well as their associated components for carrying out the processes of plasticization, injection and pressure maintaining of the polymer are all disposed in the inner cavity of a metal moving body driven to rotate pulsatorily by an electromagnetic winding. At the time when the screw and the metal moving body are simultaneously rotating pulsatorily, the screw is at the same time making axial pulsative displaments, so that the processes of plasticization, injection and pressure maintaining are all carried out in a periodic oscillating state. This type of injection moulding method and apparatus have the advantages of small volume, light weight, low manufacturing cost, low energy consumption, low noises, wide adaptability to materials and excellent quality of the moulded products.

9 Claims, 1 Drawing Sheet

POLYMER'S ELECTROMAGNETIC DYNAMIC INJECTION MOLDING METHOD AND THE APPARATUS THEREFOR

BACKGROUND OF THE INVENTION

The present invention relates to polymer moulding technology and apparatus, and more particularly to a polymer's electromagnetic dynamic injection moulding method and the apparatus therefor.

The plasticating injection device of the most commonly used conventional injection molding machine is the screw in-line injection device which is a modification of the conventional screw extruder. This kind of injection device is different from the extruder in that when the materials are being plasticized, the screw retreats and the molten materials are being charged into the space in the charging barrel created by the retreat of the end of the screw. When a certain quantity of molten materials is reached, the screw acting as a piston is made to advance by external force to inject the materials from the charging barrel into the mould cavity communicated therewith. This type of injection device has three deficiencies as follows:

(1) Owing to the retreat of the screw during plasticating, the effective length of the plasticating device is shortened, so that the effect of plasticating and mix of the molten material is not homogeneous and there is temperature difference and nonhomogeneity of temperature distribution for the molten material in the charging barrel both radially and axially affecting the quality of the products after injection.

(2) During the injection, the screw moves in segmental uniform velocity, causing the molten material to fill the mould cavity with sectioned, stable pressure, so that the viscosity and elasticity of the melt are greater, and so is the resistance to fill the mould cavity. The difficulty of filling and compacting is subject to insufficiency of filling and retaining of inner stress in the product.

(3) The high temperature needed to plasticize the materials in a conventional plasticization injection device causes the temperature of the molten material to be also high, thus causing the time for cooling the moulded products prolonged and likewise for the moulding cycle of the product.

Chinese patent NO. 90101034.0 <Electromagnetic Dynamic Plasticization Extruding Method and the Equipment Therefor> and Chinese patent NO. 92103639.6 <Screw In-line Electromagnetic Dynamic Extruder> disclosed an electromagnetic dynamic plasticization extruder quite different from the conventional screw extruder. In this extruder, the oscillating field has been indroduced into the overall process of the plasticating extrusion of polymers, altering the way of energy transduction, structural form and way of plasticating extrusion of the conventional extrution equipments creating an integrating dynamic plasticating extruder in which mechanic, electronic and electromagnetic technologies are combined into one. This sort of extruder substantially overcomes the shortcomings of the conventional extruder and has many advantages that the conventional extruder fails to have. If the design concept of this electromagnetic dynamic plasticating extruder is used to modify the plasticization injecting device of the injection machine, it will be possible to make the injection machine to have the same or similar characteristics and advantages. Further, if the oscillating field is introduced at the same time into the processes of metering and filling the mould by injection, the above-mentioned deficiencies of the conventional injection device will be completely overcome.

OBJECTS AND SUMMARY

The objects of the invention comprise to overcome the shortcomings of the prior art screw in-line injection device, to provide by means of the teachings of the inventor's Chinese patent NO. 90101034.0 <Electromagnetic Dynamic Plasticization Extruding Method and the equipment Therefor> and Chinese patent NO. 92103639.6 <Screw In-line Electromagnetic Dynamic Extruder>, a dynamic plastication and injection, dynamic pressure maintaining injection moulding method in which the oscillating field is introduced into the whole process of plasticization, injection, pressure maintaining of the polymer, and to provide a dynamic plasticization injection device for polymer which has the advantages of simple construction, small volume, light weight, low noise, low energy consumption, short moulding cycle for products and excellent quality of the products and which is designed in accordance with the method.

The objects of the invention are achieved through the following means:

A polymer's electromagnetic dynamic injection moulding method comprising the processes of plasticization, injection and pressure maintaining is characterized in that the processes of plasticization, injection and pressure maintaining are carried out in a periodic oscillation state, the periodic oscillation state being brought about by the superimposition of moving force and alternating force provided by the circumferential pulsating rotation and axial linear pulsating displacement of the screw.

The present invention also designs an apparatus for carrying out the polymer's electromagnetic dynamic injection moulding method. This apparatus is characterized in that the charging barrel, the screw and their associated components for carrying out the processes of plasticization, injection and pressure maintaining are all disposed in the inner cavity of a metal moving body driven to rotate pulsatorily by an electromagnetic winding device.

The performances of the polymer's electromagnetic dynamic injection moulding apparatus are described separately as follows:

(1) Dynamic Plasticization

The process of dynamic plasticization is similar to the processes of dynamic solids conveying, dynamic plasticization melting, dynamic melt conveying described in Chinese patents Nos. 90101034.0 and 92103639.6, the difference from them being that the melt is not extruded out from the apparatus end, but rather remains in the space within the charging barrel created by the retreat of the screw in the relative displacement of the screw and the charging barrel. Due to the fluctuation of the pressure of the melt and the axial pulsating displacement of the screw, the axial temperature difference of the materials remaining in the charging barrel is homogenized, and at the same time, the shearing stress field is also homogenized. The materials will continue to be plasticating and mixing under the action of the oscillating field, solving the problem of non-homogeneity of plasticization caused by the shortening of the effective length of the screw.

(2) Dynamic Injection

The metered melt is injected into the mould cavity by the pulsating propulsion (or stepping) of the screw. The pressure of the melt will vary as the pulsating frequency of the screw varies. This pulsating action can as well lower the viscosity and elasticity of the melt, decrease the resistance of flow, quicken the process of mould filling, uniformize the filling, and at the same tine the temperature of the melt is uniformly distributed in the mould cavity and the inner stress is decreased. If the same mould-filling resistance as the pulseless injection is maintained, the temperature of the melt during the pulsating mould filling can be lowered and the time for cooling can be shortened.

(3) Dynamic Pressure Maintaining

After the mould cavity has been filled with the melt, the screw continues to pulsate axially keeping the pressure in the mould cavity changing periodically. The instantaneous pressure peak value keeps the melt being incessantly compacted. The air in the mould cavity is easily to be dispelled due to the fluctuation of pressure. And as the viscosity of the melt is comparatively small, the cooling shrinkage cavity is easily to be compensated. Besides, as in the oscillating state, the elasticity of the melt is small and the distribution of temperature is uniform, the inner stress remaining in the product is greatly lessened, and the quality of the product bettered.

According to the present invention, the oscillating field is introduced in the whole course of processes of plasticization, injection and pressure maintaining of the polymer, employing the screw in-line structure, disposing the charging barrel and screw in the inner cavity of a rotor being driven to rotate pulsatorily by an electromagnetic winding and the rotor being auxiliarily supported at both ends by mechanical bearings and quasi-suspended in an electromagnetic field of iso-radial magnetic pull. The materials are melted under the combining action of oscillating field and shearing field and conveyed to the end of the screw. the storage space is created by the relative displacement of the screw and the charging barrel. After a certain quantity is metered, the screw and the charging barrel will again displace relatively but in a reverse order of the above-described displacement, to inject the melt into the mould cavity via a spraying nozzle. The screw is making an axial pulsating displacement during the plasticization, injection and pressure maintaining to effect the introduction of the oscillating field in the processes of metering, injection and pressure maintaining of the melt. The axial pulsating displacement of the screw can be effected by a linear stepping motor, or other electromagnetic, hydraulic, pneumatic and mechanic means, that is, to superimpose an oscillating force, the frequency, and amplitude of which can be adjusted, to the axial moving force of the screw by means of electromagnetic, hydraulic, pneumatic and mechanic means.

The present invention has the following notable advantages as compared with the prior arts:

1. The volume or weight decrease 45–50%, the manufacturing cost lowered more than 40%.

Since the introduction of oscillating field into the processes of plasticization, injection and pressure maintaining of polymer fundamentally alters the plasticization injection mechanism and way of energy transduction, the construction of the apparatus is made compact and simple, so processing and assemblage are easier, volume and weight decrease markedly, and manufacturing cost lowered.

2. Energy consumption lowered more than 35%.

As the energy transmission intermediate links of the conventional plasticization injection device is dispensed with and further, the viscosity of the melt is lowered while the plasticizaing injection temperature decreases, the power for plasticization and injection moulding is reduced.

3. High operational reliability, noise reduced to less than 75 decibels, and less oil contamination.

As the moving parts of the plasticization injection device are all in a quasi-suspensional moving state, there will be less direct mechanical contact and friction, so not only the noise is reduced, but also the operational reliability is enhanced.

4. Excellent result of plasticizing mixing, high quality of moulded products and wide adaptability to materials.

As the oscillating field is introduced into the processes of plasticization, injection and pressure maintaining, the blending and mixing of materials are strengthened, their viscosity and elasticity reduced, mould filling resistance reduced, filling speed quick and uniform, and shrinkage cavity compensation easy. Further, temperature distribution is homogeneous during the processes of plasticization and injection, and the residual internal stress in the products is reduced. So is the quality of the products is markedly bettered. Meanwhile, the action of the oscillating field can alter and satisfy the requirements of different materials for the blending and mixing, widening the adaptability to materials.

BRIEF DESCRIPTION OF THE DRAWING

The accompanying drawing is a diagrammatical view of the construction of the polymer's electromagnetic dynamic injection moulding apparatus.

DETAILED DESCRIPTION OF THE PREFERRED EMBODIMENTS

Figure 1:
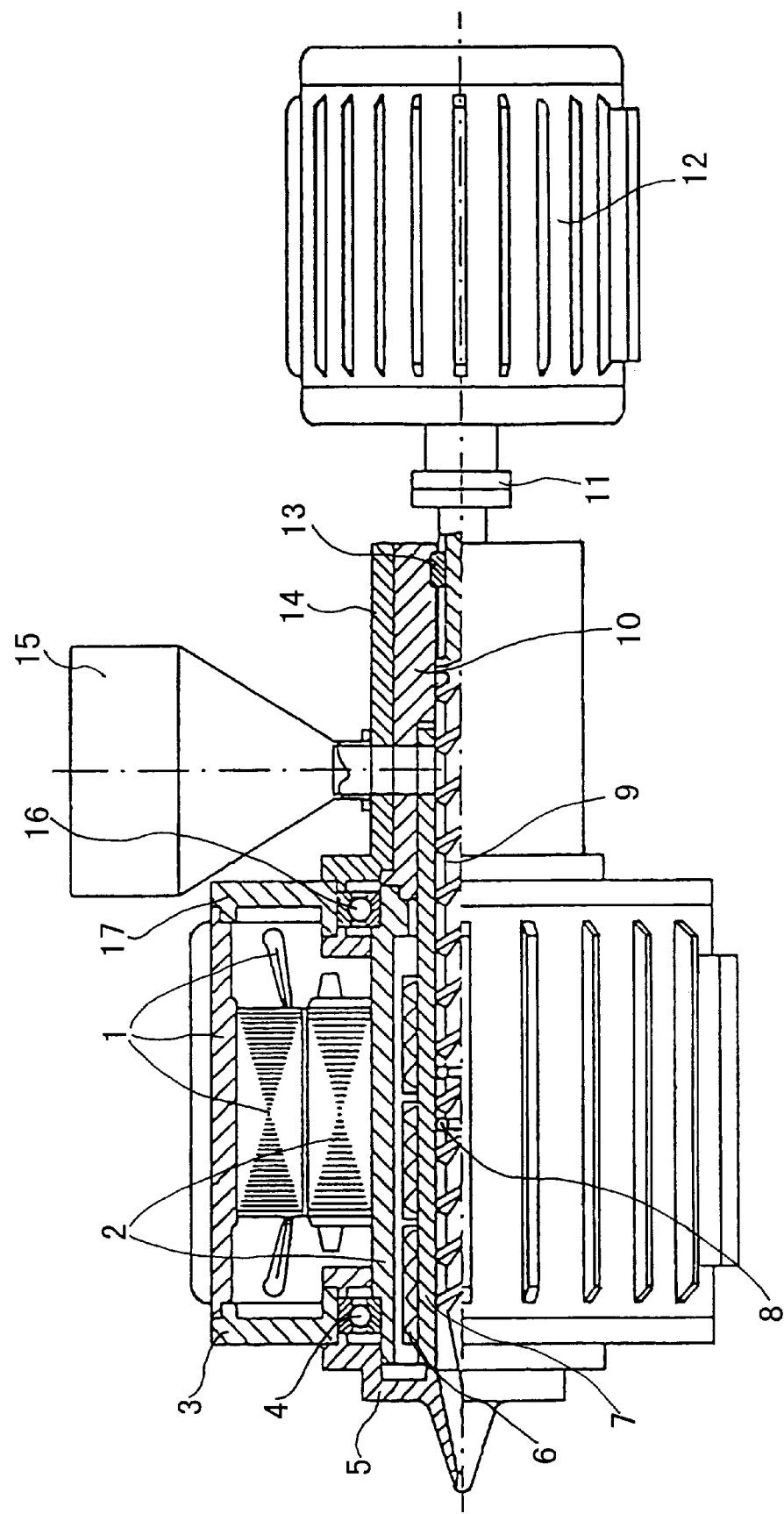

The following is a more detailed description of the present invention by means of a preferred embodiment shown in the accompanying drawing.

As shown in the drawing, the cage-rotor-like metal moving body 2 is auxiliarily supported by radial bearings 4 and 16 on front endwall 3 and rear endwall 17, and is quasi-suspended in an electromagnetic winding 1 which provides an rotary magnetic field and a harmonic pulsating magnetic field. The front endwall 3 and rear endwall 17 are fixedly mounted on the electromagnetic winding 1. The screw 9 is fixedly positioned circumferentially in relation to a power transition adaptor 10 by means of a flat key 13. The power transition adaptor 10 is fixedly mounted on the projecting end face of the metal moving body 2. The screw 9 then can pulsatively rotate with the metal moving body 2 in synchronism and is connected by a coupling 11 to a linear stepping motor 12, effecting the axial pulsating displacement. The screw 9 is encased in the bore of a charging barrel 7. The charging barrel 7 is securely connected with a spraying nozzle 5 and the spraying nozzle 5 is securely mounted on the front end wall 3. The power transition adaptor 10 is encased in the bore of the hopper seat 14 which is securely mounted on the rear end wall 17. A hopper 15 is mounted on the hopper seat 14. On the outer surface of charging barrel 7 there are provided auxiliary heaters 6 generally used for preheating before the apparatus starts to operate, so as to plasticize the materials initially solidified in the screw channel of the screw 9.

During the plasticization metering, under the actions of rotary magnetic field and harmonic pulsating magnetic field created by winding 1, the metal moving body 2 drives the screw 9 via the power transition adaptor 10 to simultaneously rotate in pulsation. The solid materials in the hopper 15 flow into the screw channel of the screw 9 through the two notches on the power transition adaptor 10 and the notch on the charging barrel 7, and are conveyed forward along the screw channel under the action of the pulsating rotation of the screw 9, being at the same time dynamically compacted, plasticized and mixed, and the gas being exhausted. In the conveyance process, the materials must pass over the plasticating balls 8. Under the action of the revolution, rotation and oscillation of the plasticating balls 8, the materials are subjected to strong dynamic calendering and further mixing and plasticizing. The plasticized melt is conveyed to the end of screw 9, causing the screw 9 to be subjected to a backward axial pressure which when in combination with the action of the linear stepping motor 12, forces the screw 9 to displace backward pulsatively until a predetermined length of travel is reached. Then the electromagnetic winding 1 stops and also the plasticizing and metering work is finished. However, at this time the screw 9 still continues to pulsate axially to homogenize the melt temperature. During injection, the screw 9 advances forward pulsatively (displace forward step by step) under the action of the linear stepping motor 12 to effect dynamic mould filling, the pressure of the melt varying as the pulsating frequency of the screw 9 varies. When maintaining the pressure, the screw 9 keeps on axially pulsating, keeping the pressure in the mould cavity to be in periodical variation, so to effect a dynamic pressure maintaining.

I claim:

1. A method of injection molding a polymer, comprising the steps of:

feeding a polymer into a first end of a charging barrel having a screw extending inside the charging barrel;

plasticating the polymer by rotating the screw in a pulsating manner and simultaneously moving the screw in a backward linear pulsating motion;

injecting the polymer by moving the screw in a forward linear pulsating motion having a first average pulse displacement; and maintaining a pressure of the polymer by moving the screw in a forward linear pulsating motion having a second average pulse displacement that is smaller than the first average pulse displacement.

2. The method according to claim 1, wherein the screw makes an axial pulsating displacement in the plasticating, injection and pressure maintaining of the polymer.

3. The method according to claim 2, wherein the axial pulsating displacement of the screw is effected by a superimposition of an pulsating force of which a frequency and amplitude are adjustable on the axial displacement.

4. The method according to claim 3, wherein the axial pulsating displacement of the screw can be effected by one of a linear stepping motor and a linear moving mechanism run by electromagnetic, hydraulic, pneumatic or mechanic power.

5. The method according to claim 4, wherein the axial pulsating displacement of the linear stepping motor is transferred to the screw by means of a coupling.

6. The method of claim 1, further comprising the step of heating the charging barrel with a heater.

7. The method of claim 1, further comprising the step of passing the polymer around plasticating balls in the charging barrel so as to subject the polymer to dynamic calendering, mixing, and plasticizing.

8. The method of claim 1, further comprising the steps of using a first power source to rotate the screw and a second power source to linearly move the screw.

9. The method of claim 8, further comprising the step of connecting the screw to the first power source with a connection that enables linear displacement between the screw and the first power source.

* * * * *